(12) United States Patent
Boeman

(10) Patent No.: US 9,405,091 B2
(45) Date of Patent: Aug. 2, 2016

(54) PARABOLIC REFLECTOR

(71) Applicant: Thomas Boeman, Chicago, IL (US)

(72) Inventor: Thomas Boeman, Chicago, IL (US)

(*) Notice: Subject to any disclaimer, the term of this patent is extended or adjusted under 35 U.S.C. 154(b) by 0 days.

(21) Appl. No.: 14/978,504

(22) Filed: Dec. 22, 2015

(65) Prior Publication Data

US 2016/0109684 A1    Apr. 21, 2016

Related U.S. Application Data

(63) Continuation of application No. 13/014,920, filed on Jan. 27, 2011, now Pat. No. 9,268,069.

(60) Provisional application No. 61/299,476, filed on Jan. 29, 2010.

(51) Int. Cl.
| | | |
|---|---|---|
| *G02B 5/10* | (2006.01) | |
| *G02B 7/183* | (2006.01) | |
| *G02B 7/188* | (2006.01) | |
| *G02B 1/04* | (2006.01) | |
| *G02B 19/00* | (2006.01) | |
| *G02B 26/08* | (2006.01) | |
| *F24J 2/12* | (2006.01) | |

(52) U.S. Cl.
CPC ........ *G02B 7/183* (2013.01); *G02B 1/04* (2013.01); *G02B 5/10* (2013.01); *G02B 7/188* (2013.01); *G02B 19/0023* (2013.01); *G02B 26/0825* (2013.01); *F24J 2/125* (2013.01); *Y02E 10/45* (2013.01); *Y02E 10/47* (2013.01)

(58) Field of Classification Search
CPC .......... G02B 5/10; G02B 7/183; G02B 7/188; G02B 26/0825; F24J 2/125; Y02E 10/45; Y02E 10/47

USPC .......... 359/846, 847, 853, 869; 126/684, 690, 126/694, 696
See application file for complete search history.

(56) References Cited

U.S. PATENT DOCUMENTS

| | | | | | |
|---|---|---|---|---|---|
| 2,129,513 | A | * | 9/1938 | Wegener | G02B 27/06 33/9 R |
| 4,173,397 | A | * | 11/1979 | Simpson | F24J 2/07 126/684 |
| 4,243,301 | A | * | 1/1981 | Powell | F24J 2/1052 29/449 |
| 4,299,446 | A | * | 11/1981 | Jenkins, Jr. | G02B 5/10 348/782 |
| 4,469,938 | A | * | 9/1984 | Cohen | F24J 2/145 126/577 |
| 4,493,313 | A | * | 1/1985 | Eaton | F24J 2/145 126/570 |
| 4,820,033 | A | * | 4/1989 | Sick | F24J 2/145 123/438 |
| 6,915,677 | B1 | * | 7/2005 | Tolomeo | G02B 26/0825 343/915 |
| 7,553,035 | B2 | * | 6/2009 | Wright | F24J 2/14 359/847 |
| 9,268,069 | B2 | * | 2/2016 | Boeman | G02B 5/10 |
| 2008/0023061 | A1 | * | 1/2008 | Clemens | F24J 2/1052 136/246 |
| 2011/0249353 | A1 | * | 10/2011 | White | F24J 2/125 359/846 |

* cited by examiner

*Primary Examiner* — Ricky D Shafer
(74) *Attorney, Agent, or Firm* — Dentons US LLP

(57) ABSTRACT

A reflection device including a sheet of flexible material with memory capabilities having a surface with a reflective property. The sheet comprises an elastic bendable material of a uniform thickness and the width of the sheet varies from the first end to the second end. The sheet forms into a parabolic shape by pulling the first end of the sheet toward the second end of the sheet and coupling them to the first and second securing ends of the securing mechanism.

9 Claims, 5 Drawing Sheets

PARABOLIC REFLECTOR

CROSS-REFERENCE TO RELATED APPLICATIONS

The present application is a continuation of U.S. Non-provisional application Ser. No. 13/014,920 filed Jan. 27, 2011 incorporated herein by reference in its entirety and claims the benefit of the filing date of U.S. Provisional Application No. 61/299,476, entitled "A Parabolic Reflector," filed on Jan. 29, 2010, which is incorporated herein by reference.

FIELD OF THE INVENTION

This invention deals with parabolic solar reflectors used to focus waves on a single focal point.

BACKGROUND OF THE INVENTION

A parabolic reflector is a device used to collect waves of energy including light waves, radio waves or sound waves. Waves of energy striking the surface of the parabolic reflector are reflected off of the surface of the reflector and focused on a focal point of the collector. The parabolic reflector can be used to concentrate waves to a single focal point which can be transmitted as a single beam transmitted parallel to the axis of the parabola. Parabolic collectors are currently used in solar collectors, radio wave collectors, lighting devices, radio telescopes and other applications where the collection of waves is of importance.

Currently, parabolic reflectors require a rigid support framework to hold the reflector in the shape of a parabola. Because of this rigid framework, parabolic reflectors are not very mobile and require extensive manpower and materials to install. Further, once installed, typical parabolic collectors are difficult to move. In addition, the support rigid framework increases the cost of using a typical parabolic collector due to the additional cost of material and manpower to assemble the reflector.

It would be beneficial to have an inexpensive mobile parabolic collector which will allow for a simplified assembly and better mobility.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment consistent with the present invention includes a reflection device comprising a sheet made of a flexible material with at least one surface having reflective properties including a first edge and a second edge on opposite sides of a center line of the sheet, where the first edge and the second edge of the sheet are shaped such that the flexible material is formed into a mostly parabolic shape in cross section when bent about a line perpendicular to the center line and the sheet is secured at two points along the center line.

In another embodiment consistent with the present invention, the first edge and second edge are offset from each other in a vertical direction such that the mostly parabolic shape is inclined by an angle θ.

In another embodiment consistent with the present invention, the length of the flexible material is defined by the equation $$L = \int_{X1}^{X2} \left| \frac{1}{4}\sqrt{4\left(\frac{X'}{A}\right)^2+1} * 2\left(\frac{X'}{A}\right) + \ln\left|\sqrt{4\left(\frac{X'}{A}\right)^2+1} + 2\left(\frac{X'}{A}\right)\right| \right|$$

where A is a scaling factor defined by the equation $$A = \tfrac{1}{4}F$$

and F is the distance from the horizontal axis to the focal point of the parabola.

In another embodiment consistent with the present invention, the flexible material is made from a material that does not have memory capabilities, and the shape of the first edge conforms to a line formed by a plurality of points defined by the equations $$a = \int_{X1'}^{X'} \sqrt{1+\left(\frac{dY}{dX}\right)^2} = X' \Big|_{X1'}^{X'} \quad \text{(equation 1)}$$

$$\tfrac{1}{4}\left[\sqrt{4\left(\frac{X'}{A}\right)^2+1} * 2\frac{X'}{A} + \ln\left|\sqrt{4\left(\frac{X'}{A}\right)^2+1} + 2\left(\frac{X'}{A}\right)\right|\right]$$

$$b = B * \frac{\frac{d^2Y}{dX^2}}{\sqrt{1+\left(\frac{dY}{dX}\right)^2}} = B * \frac{\left(\cos\theta + 2\left(\frac{X'}{A}\right)\sin\theta\right)*2\cos\theta - \left(-\sin\theta + 2\left(\frac{X'}{A}\right)\cos\theta\right)*2\sin\theta}{\left(\cos\theta+2\left(\frac{X'}{A}\right)\sin\theta\right)^3 * \sqrt{1+\left(\frac{-\sin\theta+2\left(\frac{X'}{A}\right)\cos\theta}{\cos\theta+2\left(\frac{X'}{A}\right)\sin\theta}\right)^2}} \quad \text{(equation 2)}$$

where a is a coordinate point in the vertical direction, b is a coordinate point in the horizontal direction, X1' is a starting position in the horizontal position and X' is a position along the horizontal direction, cutting the material along a line formed by the plurality of plotted points.

In another embodiment consistent with the present invention, at least one surface of the flexible material reflects light.

In another embodiment consistent with the present invention, at least one surface of the flexible material reflects energy waves In another embodiment consistent with the present invention, the reflection device includes a plurality of sheets which overlap one another to form a trough.

In another embodiment consistent with the present invention, the flexible material is made from a material that has memory capabilities, and the shape of the first edge conforms to a line formed by a plurality of points defined by the equations $$a = \int_{X1'}^{X'} \sqrt{1+\left(\frac{dY'}{dX'}\right)^2} = \left.\frac{X'}{X1'}\right|\frac{1}{4}\left[\sqrt{4\left(\frac{X'}{A}\right)^2+1}*2\left(\frac{X'}{A}\right)+\ln\left|\sqrt{4\left(\frac{X'}{A}\right)^2+1}+2\left(\frac{X'}{A}\right)\right|\right] \quad \text{(equation 1)}$$

$$b = B*\left(\left(\frac{X2'}{A}\right)*\left(\frac{X'}{A}\right)+\left(\frac{X1'}{A}\right)*\left(\frac{X'}{A}\right)-\left(\frac{X1'}{A}\right)*\left(\frac{X2'}{A}\right)-\left(\frac{X'}{A}\right)^2\right)\left(1+4\left(\frac{X'}{A}\right)^2\right)^{3/2} \quad \text{(equation 2)}$$

where a is a coordinate point in the vertical direction, b is a coordinate point in the horizontal direction, X1' is a starting coordinate point in the horizontal position, X2' is the ending coordinate point in the horizontal direction, X' is a position between X1' and X2' in the horizontal direction.

In another embodiment consistent with the present invention, the flexible material is made of, Plexiglas, Lexan, fiberglass or carbon fiber.

In another embodiment consistent with the present invention, a plurality of flexible sheets are overlapped to form a trough structure.

Another embodiment consistent with the present invention include a method of producing a reflection device including the steps of shaping a first edge and a second edge on opposite sides of a center line of a sheet made of flexible material such that the flexible material is formed into a mostly parabolic shape in cross section when bent about a line perpendicular to a center line of the sheet and the sheet is secured at two points along the center line, where the sheet has at least one surface having reflective properties.

In another embodiment consistent with the present invention, the first edge and second edge are offset from each other in a vertical direction such that the mostly parabolic shape is inclined by an angle θ.

the length of the flexible material is defined by the equation $$L = \left.\frac{X2}{X1}\right|\frac{1}{4}\sqrt{4\left(\frac{X'}{A}\right)^2+1}*2\left(\frac{X'}{A}\right)+\ln\left|\sqrt{4\left(\frac{X'}{A}\right)^2+1}+2\left(\frac{X'}{A}\right)\right|$$

where A is a scaling factor defined by the equation $$A = \tfrac{1}{4}F$$

where F is the distance from the horizontal axis to the focal point of the parabola.

In another embodiment consistent with the present invention, the flexible material is made from a material that does not have memory capabilities, and the shape of the first edge conforms to a line formed by a plurality of points defined by the equations $$a = \int_{X1'}^{X1'} \sqrt{1+\left(\frac{dY}{dX}\right)^2} = \left.\frac{X'}{X1'}\right|\frac{1}{4}\left[\sqrt{4\left(\frac{X'}{A}\right)^2+1}*2\frac{X'}{A}+\ln\left|\sqrt{4\left(\frac{X'}{A}\right)^2+1}+2\left(\frac{X'}{A}\right)\right|\right] \quad \text{(equation 1)}$$

$$b = B*\frac{\frac{d^2Y}{dX^2}}{\sqrt{1+\left(\frac{dY}{dX}\right)^2}} = B*\frac{\left(\cos\theta+2\left(\frac{X'}{A}\right)\sin\theta\right)*2\cos\theta-\left(-\sin\theta+2\left(\frac{X'}{A}\right)\cos\theta\right)*2\sin\theta}{\left(\cos\theta+2\left(\frac{X'}{A}\right)\sin\theta\right)^3*\sqrt{1+\left(\frac{-\sin\theta+2\left(\frac{X'}{A}\right)\cos\theta}{\cos\theta+2\left(\frac{X'}{A}\right)\sin\theta}\right)^2}} \quad \text{(equation 2)}$$

where a is a coordinate point in the vertical direction, b is a coordinate point in the horizontal direction, X1' is a starting position in the horizontal position and X' is a position along the horizontal direction, cutting the material along a line formed by the plurality of plotted points.

In another embodiment consistent with the present invention, at least one surface of the flexible material reflects light.

In another embodiment consistent with the present invention, at least one surface of the flexible material reflects light.

In another embodiment consistent with the present invention, at least one surface of the flexible material reflects energy waves.

In another embodiment consistent with the present invention, where a plurality of sheets overlap one another to form a trough.

In another embodiment consistent with the present invention, the flexible material is made from a material that has memory capabilities, and the shape of the first edge conforms to a line formed by a plurality of points defined by the equations $$a = \int_{X1'}^{X'} \sqrt{1+\left(\frac{dY'}{dX'}\right)^2} = \left.\frac{X'}{X1'}\right|\frac{1}{4}\left[\sqrt{4\left(\frac{X'}{A}\right)^2+1}*2\left(\frac{X'}{A}\right)+\ln\left|\sqrt{4\left(\frac{X'}{A}\right)^2+1}+2\left(\frac{X'}{A}\right)\right|\right] \quad \text{(equation 1)}$$

$$b = B*\left(\left(\frac{X2'}{A}\right)*\left(\frac{X'}{A}\right)+\left(\frac{X1'}{A}\right)*\left(\frac{X'}{A}\right)-\left(\frac{X1'}{A}\right)*\left(\frac{X2'}{A}\right)-\left(\frac{X'}{A}\right)^2\right)\left(1+4\left(\frac{X'}{A}\right)^2\right)^{3/2} \quad \text{(equation 2)}$$

where a is a coordinate point in the vertical direction, b is a coordinate point in the horizontal direction, X1' is a starting coordinate point in the horizontal position, X2' is the ending coordinate point in the horizontal direction, X' is a position between X1' and X2' in the horizontal direction.

In another embodiment consistent with the present invention, the flexible material is made of, Plexiglas, Lexan, fiberglass or carbon fiber.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

As disclosed in further detail herein, is a parabolic reflector consisting of a sheet of material secured at two edges. The width of the material is configured such the material self-forming into a geometrically correct parabola when secured along two edges of the material. Further, the present invention also entails a method of forming the sheet of material such that the material forms a geometrically correct parabola opposed to a catenary. By producing a geometrically correct parabola, energy waves are tightly focused on a focal point which improves the performance of the reflector without requiring a rigid support structure to form the parabola.

Figure 1:
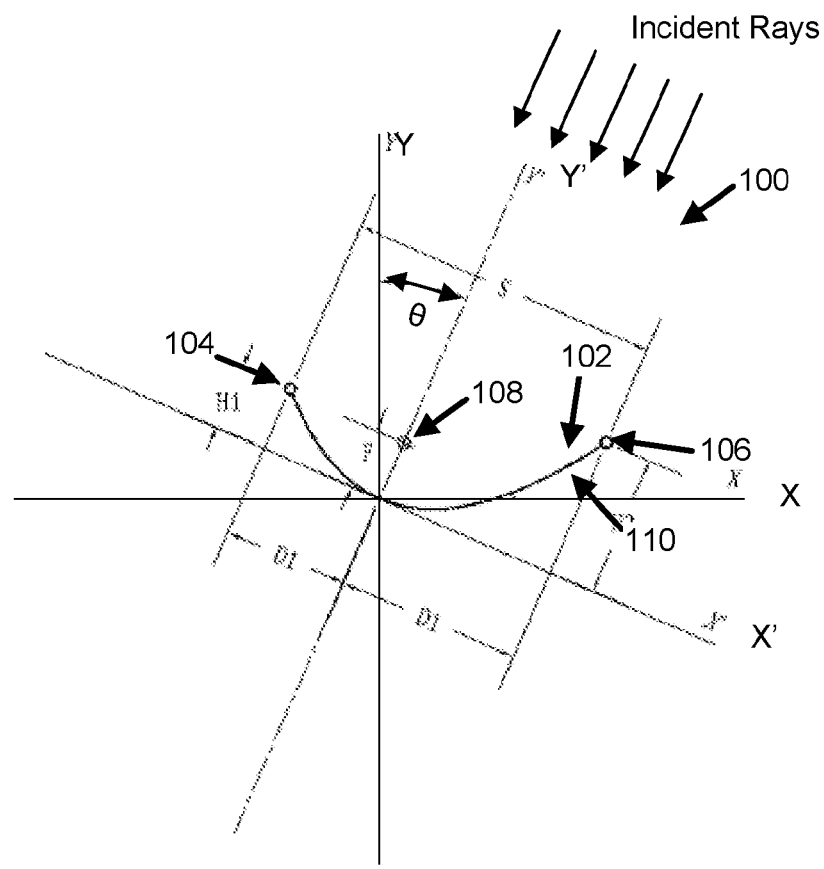
FIG. 1 depicts a side view of a parabolic reflector consistent with the present invention.

FIG. 1 depicts a side view of a parabolic reflector 100 consistent with the present invention. The reflector includes a sheet of material 102, which is secured at two edges 104 and 106. The shape of the parabola is effective to direct waves of energy or light transmitted parallel to the axis of the parabola to the focal point of the parabola 108. The sides of the material when laid flat are shaped such that the surface of the material 110 hangs down to form the parabolic shape without the use of a rigid support structure. In one embodiment, the sheet is made from a flexible material including, but not limited to reflective plastic, cloth, silk, mylar, or any other flexible material that does not resist bending.

As FIG. 1 depicts, the X and Y axis are introduced parallel to the horizontal and vertical respectively. The X' and Y' axis are introduced proper to the parabola with the Y' axis coinciding with the axis of the parabola and inclined by an angle theta Θ from the vertical. The angle theta Θ represents the angle incident rays and the axis of the parabola are offset from the vertical direction.

For a parabola supported at Cartesian positions (−D1, H1) and (D2, H2) with a span S parallel to the X' axis, a parabola is defined on the same Cartesian coordinate system between the positions X1' 104 and X2' 106 using a scaling factor A calculated by the equation:

$$A = \frac{S^2}{(\sqrt{H1} + \sqrt{H2})} = \frac{D1^2}{H1} = \frac{D2^2}{H2} = \frac{1}{4}F$$

Where F is the distance from the X' axis to the focal point of the parabola 108.

The length of the parabolic reflector is defined by the following equation:

$$L = \int_{X1'}^{X2'} \left| A * \frac{1}{4} \sqrt{4\frac{X'}{A} + 1} * 2\frac{X'}{A} + \ln\left|\sqrt{4\left(\frac{X'}{A}\right)^2 + 1} + 2\frac{X'}{A}\right| \right|$$

An operator may select a piece of material longer than the length calculated using the above mentioned equation.

Figure 2:
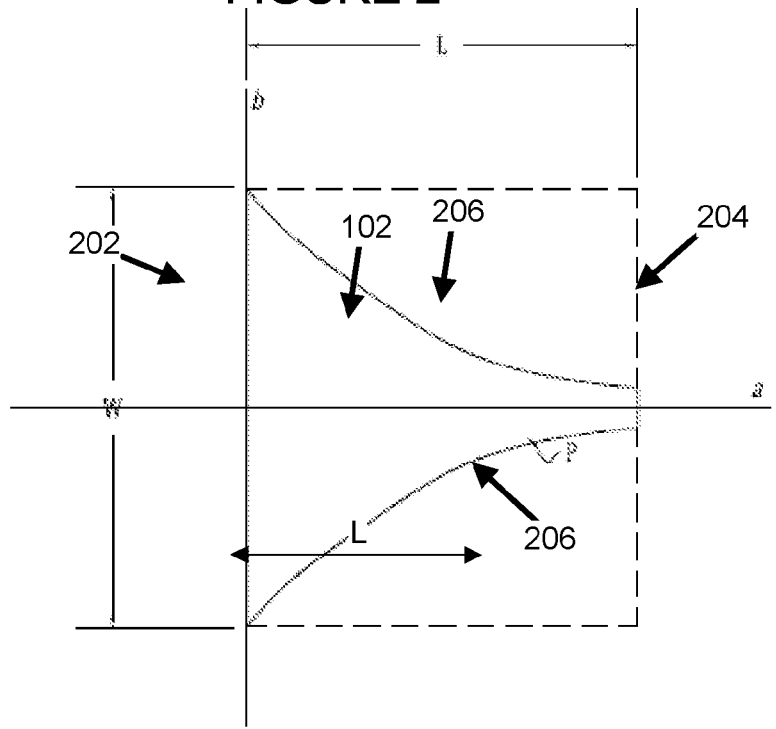
FIG. 2 depicts a plan view of a parabolic reflector consistent with the present invention.

Next, an equation for cutting two sides of a piece of material that will form the parabolic shape when the material is suspended from two edges is determined. FIG. 2 depicts a plan view of a parabolic reflector 100 consistent with the present invention. In the plan view, the parabolic reflector includes a first end 202, a second end 204 and two sides 206.

The width, W, of the parabolic reflector 100 varies along the horizontal X axis such that the distribution of weight across the reflector is proportional to the equation $$\frac{\frac{d^2 Y}{dX^2}}{\sqrt{1 + \left(\frac{dY}{dX}\right)^2}}$$

which results in the slack of the material 102 forming a parabolic shape with a focal point offset by the angle theta Θ when viewed from the side. To produce this effect, the sides of a rectangular sheet 206 of material are manipulated such that the shape of the material distributes the weight in such a manner as to form the material into a parabola with a focal point offset by the angle theta Θ.

The curve defining the sides 206 of the sheet of material 102 is created by sequentially plotting positions along the a and b axis for the interval X1' to X2', as shown in FIG. 2. For each X' over the interval X1' to X2' along the length of the parabola L, the horizontal position on the line is calculated using the following equation:

$$a = \int_{X1'}^{X'} \sqrt{1 + \left(\frac{dY}{dX}\right)^2} =$$

$$\int_{X1'}^{X'} \left|\frac{1}{4}\left[\sqrt{4\left(\frac{X'}{A}\right)^2 + 1} * 2\frac{X'}{A} + \ln\left|\sqrt{4\left(\frac{X'}{A}\right)^2 + 1} + 2\left(\frac{X'}{A}\right)\right|\right]\right|$$

and the position b is determined by the equation:

$$b = B * \frac{\frac{d^2Y}{dX^2}}{\sqrt{1 + \left(\frac{dY}{dX}\right)^2}} = B * \frac{\left(\cos\theta + 2\left(\frac{X'}{A}\right)\sin\theta\right) * 2\cos\theta - \left(-\sin\theta + 2\left(\frac{X'}{A}\right)\cos\theta\right) * 2\sin\theta}{\left(\cos\theta + 2\left(\frac{X'}{A}\right)\sin\theta\right)^3 * \sqrt{1 + \left(\frac{-\sin\theta + 2\left(\frac{X'}{A}\right)\cos\theta}{\cos\theta + 2\left(\frac{X'}{A}\right)\sin\theta}\right)^2}}$$

Where B is scale factor calculated by the equation:

$$B = \frac{1}{2}\frac{W}{\max}\text{over }[X1', X2']\text{ of}$$

$$\left\{\frac{\left(\cos\theta + 2\left(\frac{X'}{A}\right)\sin\theta\right)*2\cos\theta - \left(-\sin\theta + 2\left(\frac{X'}{A}\right)\cos\theta\right)*2\sin\theta}{\left(\cos\theta + 2\left(\frac{X'}{A}\right)\sin\theta\right)^3 * \sqrt{1+\left(\frac{-\sin\theta + 2\left(\frac{X'}{A}\right)\cos\theta}{\cos\theta + 2\left(\frac{X'}{A}\right)\sin\theta}\right)^2}}\right\}$$

When the two lines defining the sides of the parabola in plan view are determined using the above equations, the material 102 may be suspended, without tension, by two parallel rods and the material 102 will form a parabola which is effective to reflect light in such a manner that the light is focused on the focal point of the parabola 108.

Figure 3A:
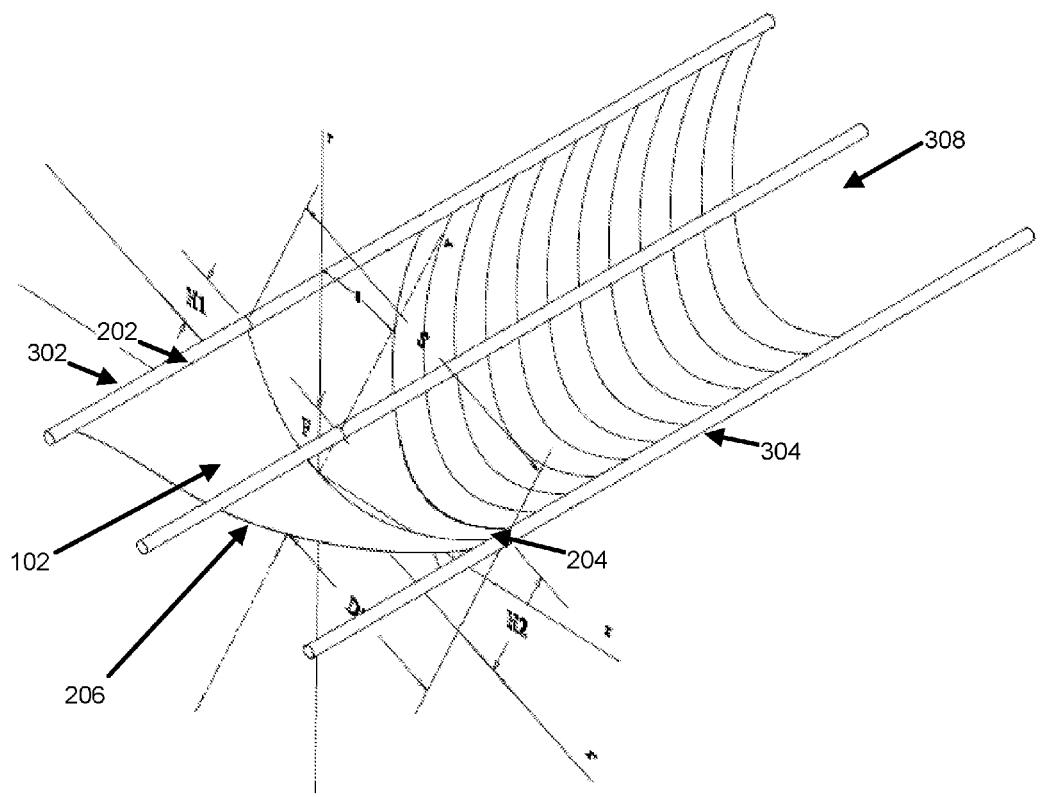
FIG. 3A depicts a plurality of parabolic reflectors consistent with the present invention which are mounted together and restrained by two rods.

FIG. 3A depicts a plurality of parabolic reflectors 100 consistent with the present invention that are secured to a first support unit 302 and a second support unit 304. The length of each of the sheets of material 102 and the shape of the sides of sheet of material 102 shown in FIG. 3A are calculated using the above equations.

Each of the first ends 202 of the parabolic reflectors 100 are secured to a first support unit 302 and each of the second ends 204 of the parabolic reflectors 100 are secured to a second support unit 304. The parabolic reflectors 100 are each secured to the support units using securing methods including, but not limited to, nailing each of the ends 202 and 204 to the support units 302 and 304, gluing each of the ends 202 and 204 to the support units 302 and 304, stapling each of the ends 202 and 204 to the support units 302 and 304, or any other acceptable method of securing the ends 202 and 204 to the support units.

Figure 3B:
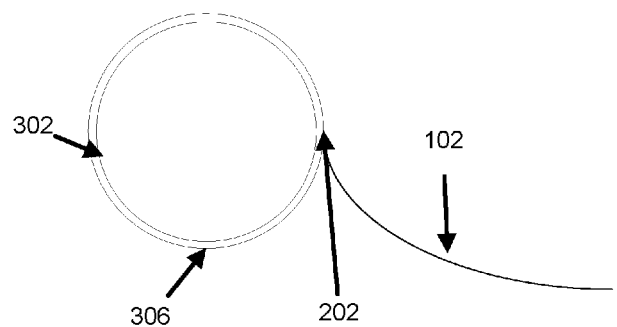
FIG. 3B depicts a parabolic reflector connecting to a support unit consistent with the present invention.

FIG. 3B depicts one embodiment of a parabolic reflector 100 connecting to a support unit. As depicted in FIG. 3B, one of the ends 202 or 204 is folded over and secured to form a sleeve 306 through which a support unit 302 or 304 is inserted. The sleeve 306 is formed by wrapping excess material at the ends 202 or 204 around one of the support units 302 or 304 and securing the end 202 or 204 to material 102. The end 202 or 204 is secured to the material 102 using securing methods including, but not limited to, sewing the end 202 or 204 to the material 102, gluing 202 or 204 to the material 102 or any other method of securing the ends 202 or 204 to the material to form a sleeve 306.

In one embodiment consistent with the present invention, the length of the material 102 is increased by an amount equal to the circumference of the support unit 302 or 304.

In another embodiment consistent with the present invention, a plurality of parabolic reflectors 100 are arranged such that each of the parabolic reflectors 100 overlaps the adjacent parabolic reflector creating a trough 308, as shown in FIG. 3A. With this arrangement, it is possible to concentrate light to multiple focal points over a large area. In addition, since the parabolic reflectors only require two edges to secure them in place, installation and manufacturing costs are greatly reduced.

The present embodiment has numerous applications including, but not limited to, a solar trough for use in high temperature solar collection, a daylight reflector for daylight harvesting of light, as a reflector for artificial lighting system, or as a mobile solar or radio wave collector. Because the present embodiment does not require a support structure, it can be assembled and disassembled quickly making it ideal for portable or temporary applications. Further, since the present embodiment does not require a support structure, the cost of manufacturing the parabolic reflector is reduced.

Figure 4:
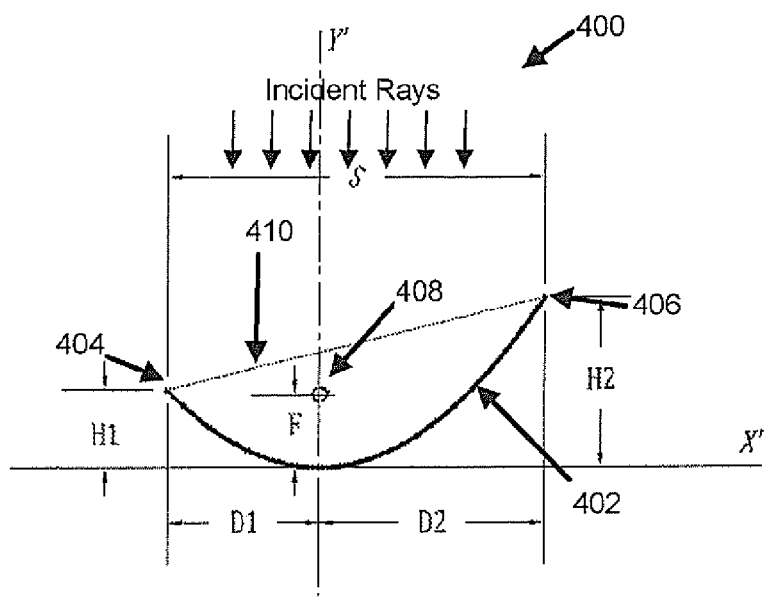
FIG. 4 depicts a side view of a parabolic reflector consistent with the present invention.

FIG. 4 depicts a side view of a parabolic reflector 400 consistent with the present invention. An elastic bendable flat sheet 402 of uniform thickness and variable width is secured at two points 404 and 406 using a securing mechanism 410 including, but not limited to, a wire, a string, a rod or any other mechanism, which can secure the ends of the sheet 402. The width of the sheet 402 is adjusted along its length manipulating the sheet's resistance to bending such that the sheet 402 forms a parabolic shape. By forming the sheet into a parabolic shape, light entering the parabola is reflected in such a manner that the light is focused on the focal point of the parabola 408.

The parabolic sheet is cut from an elastic bendable flat sheet 402 having a W as selected by an operator. The length of the sheet L is a function of the profile of parabola as shown in FIG. 4 and is defined by the following equation:

$$L = \left.\frac{1}{4}\left[\sqrt{4\left(\frac{X'}{A}\right)^2+1}*2\left(\frac{X'}{A}\right)+\ln\left|\sqrt{4\left(\frac{X'}{A}\right)^2+1}+2\left(\frac{X'}{A}\right)\right|\right]\right|_{X1}^{X2}$$

Where A is a scaling factor calculated by the equation:

$$A = \frac{S^2}{\left(\sqrt{H1}+\sqrt{H2}\right)} = \frac{D1^2}{H1} = \frac{D2^2}{H2} = \frac{1}{4}F$$

as discussed above.

Figure 5:
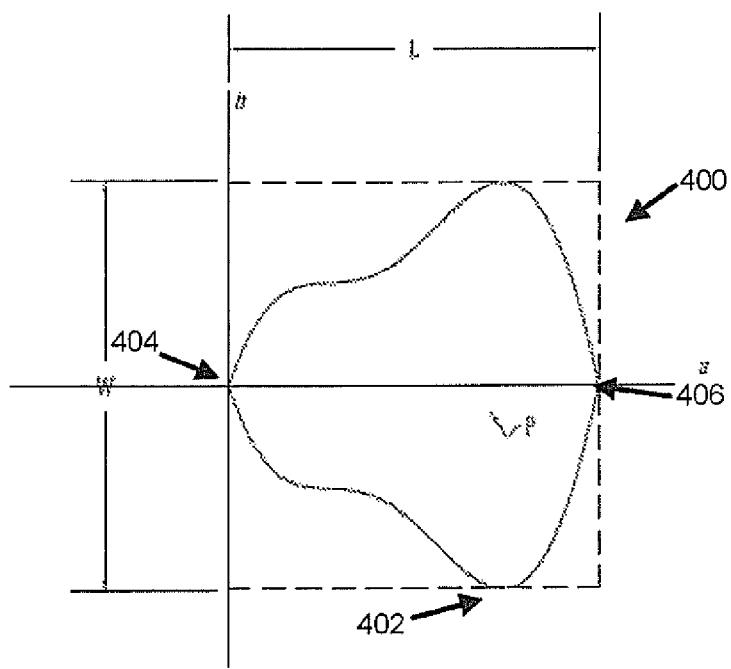
FIG. 5 depicts a plan view of the sheet before bending which is consistent with the present invention.

FIG. 5 depicts a plan view of the sheet 402 before bending, which is consistent with the present invention. The length of the sheet 402 L is calculated using the equation discussed above. As FIG. 5 demonstrates, the width of the sheet W varies in the horizontal direction. When the sheet is secured with a securing mechanism, it bends into the shape of a parabola without the need for any additional support other than the securing mechanism The curve defining each side of the Sheet is created by sequentially plotting positions along the a and b axis for the interval X1' to X2', as shown in FIG. 5. For each X' over the interval X1' to X2', a position is calculated using the following equation:

$$a = \int_{X1'}^{X'}\sqrt{1+\left(\frac{dY'}{dX'}\right)^2} =$$

$$\left.\frac{1}{4}\left[\sqrt{4\left(\frac{X'}{A}\right)^2+1}*2\left(\frac{X'}{A}\right)+\ln\left|\sqrt{4\left(\frac{X'}{A}\right)^2+1}+2\left(\frac{X'}{A}\right)\right|\right]\right|_{X1'}^{X'}$$

and the position b is determined by the equation:

$$b = B*\frac{\left(\left(\frac{X2'}{A}\right)*\left(\frac{X'}{A}\right)+\left(\frac{X1'}{A}\right)*\left(\frac{X'}{A}\right)-\left(\frac{X1'}{A}\right)*\left(\frac{X2'}{A}\right)-\left(\frac{X'}{A}\right)^2\right)}{\left(1+4\left(\frac{X'}{A}\right)^2\right)^{3/2}}$$

Where B is a scale factor given by the equation:

$$B = 1/2W / \max\text{over}[X1, X2] \text{ of}$$

$$\frac{\left[\left(\frac{X2'}{A}\right)*\left(\frac{X'}{A}\right)+\left(\frac{X1'}{A}\right)*\left(\frac{X'}{A}\right)-\left(\frac{X1'}{A}\right)*\left(\frac{X2'}{A}\right)-\left(\frac{X'}{A}\right)^2\right]}{\left(1+4\left(\frac{X'}{A}\right)^2\right)^{3/2}}$$

The length of the cable or string required to connect the ends of the parabola, 404 and 406, is defined by the following equation:

$$\sqrt{(H2-H1)^2+S^2}$$

Figure 6:
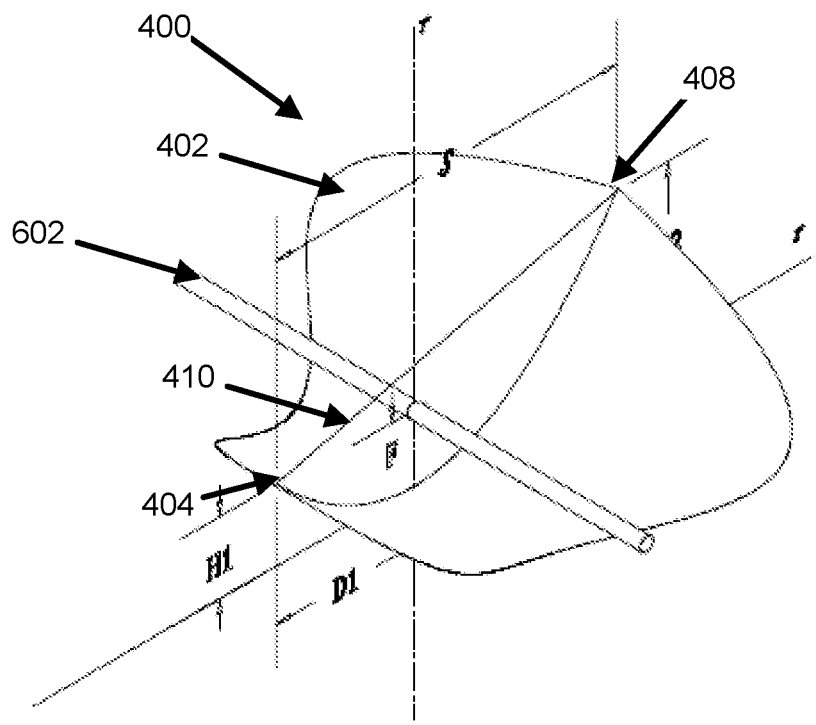
FIG. 6 depicts a parabolic reflector consistent with the present invention which is secured by a securing mechanism.

FIG. 6 depicts a parabolic reflector 400 consistent with the present invention that is secured by a securing mechanism 410. The length of the securing mechanism 410 is determined using the equation to determine the length of the cable of string disclosed above. When the securing mechanism 410 is connected to both securing points 404 and 408, the sides of the material 402 are pulled together to form the parabolic shape calculated using the method described above.

The securing mechanism 410 is coupled to the parabolic reflectors at securing points 404 and 408 using a coupling method including, but not limited to, gluing the securing mechanism 410 to a securing point 404 or 408, gluing the securing mechanism to a securing point 404 or 408, welding the securing mechanism 410 to a securing point 404 or 408, or by any other suitable method of coupling the securing mechanism 410 to a securing point 404 or 408.

In one embodiment consistent with the present invention, a collector 602 is situated at the focal point of the parabola to collect rays reflected from the parabola.

Figure 7:
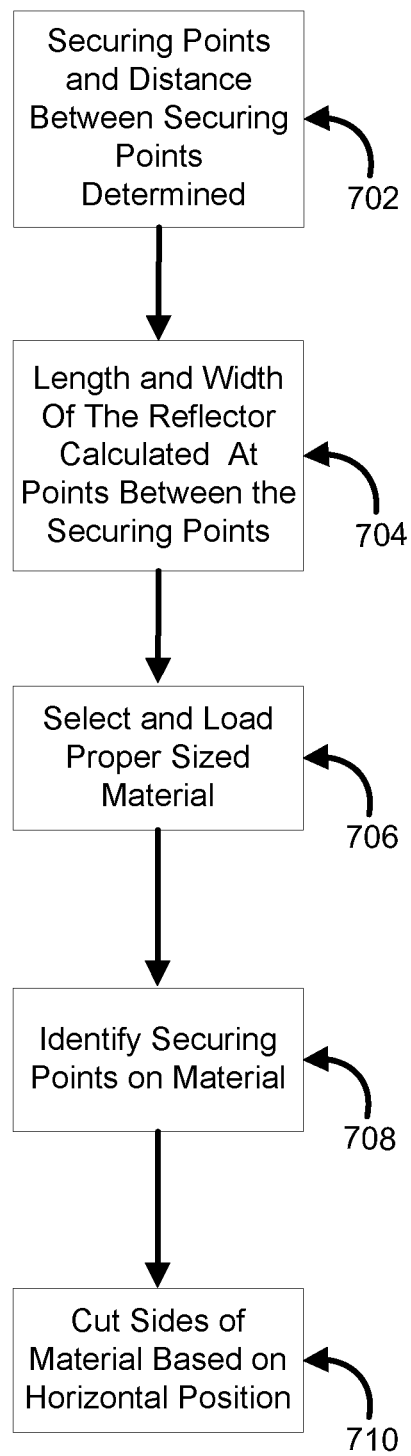
FIG. 7 is a functional block diagram of a method of producing a gravity formed parabolic reflector consistent with the present invention.

FIG. 7 is a functional block diagram of a method of producing a gravity formed parabolic reflector will be described performed by a cutting system which includes a memory, a processor and a user interface. First, the securing points and the span between the securing points for the parabolic reflector are identified on a Cartesian coordinate system and are inputted into the cutting system by the user interface (Step 702). Next, the cutting system calculates the length and width of the reflector at the points between the two securing points. (Step 704). The cutting system then selects a suitable piece of material which is capable of being cut into the desired shape based on the length and width calculations.

Once the length and width of the reflector are calculated between both of the securing points, the selected piece of material is loaded into the cutting system (Step 706). The material is automatically fed into the cutting system via a material feeding unit. The cutting system then identifies the position on the material where the securing units will be positioned and cuts the material to the desired length (Step 708). The cutting system then moves a cutting unit in the horizontal direction and shapes the sides of the material based on the horizontal position of the cutting unit based on the equations listed above (Step 710).

Once the material is cut, the parabolic reflector is secured in position using a securing unit, including, but not limited to a baton, roller or any other suitable securing mechanism. Once secured, the reflector will assume a parabolic shape due to the weight distribution of the material.

In another embodiment consistent with the present invention, an elastic bendable parabolic reflector is produced using the same method depicted in FIG. 6. The elastic bendable parabolic reflector is made of a stiff material with memory capabilities including, but not limited to, plastic, Plexiglas, Lexan, fiberglass or carbon fiber sheet, or any other bendable material with memory capabilities. In addition, the elastic bendable sheet is secured by two securing units which include, but are not limited to a cable, wire or any other securing means.

The present embodiment has numerous applications including, but not limited to, a solar trough for use in high temperature solar collection, a daylight reflector for daylight harvesting of light, as a reflector for artificial lighting system, as a mobile solar collector or radio wave collector or as a lunar high temperature solar collector which can be used in a zero gravity environment. Because the present embodiment does not require a support structure, it can be assembled and disassembled quickly making it ideal for portable or temporary applications. Further, since the present embodiment does not require a support structure, the cost of manufacturing the parabolic reflector is reduced.

What is claimed is:

1. A reflection device comprising:
   a sheet of flexible material with memory capabilities having a surface with a reflective property, a first end, a second end, a first side and a second side, and
   a securing mechanism,
   wherein the sheet comprises an elastic bendable material of a uniform thickness, and has a length measured between the first end and the second end, and a width measured between the first side and the second side and perpendicular to the length,
   wherein the width of the sheet varies from the first end to the second end;
   wherein the securing mechanism has a securing mechanism length and a first securing end and a second securing end, and
   wherein the sheet forms into a parabolic shape by pulling the first end of the sheet toward the second end of the sheet and coupling them to the first and second securing ends of the securing mechanism.

2. The reflection device of claim 1, wherein the sheet is made of, acrylic, polycarbonate, fiberglass or carbon fiber.

3. The reflection device of claim 1, wherein a plurality of sheets are overlapped to form a trough structure.

4. The reflection device of claim 1, wherein
   the parabolic shape of the sheet has a Cartesian coordinate system comprising a X' axis and a Y' axis, wherein the Y' axis and X' axis are mutually perpendicular and the Y' axis corresponds to an axis of symmetry of the parabola and the X' axis;
   the Y' axis and the parabolic shape intersect at a common point at a base of the parabolic shape, wherein the parabolic shape has a focal point,
   wherein F is a distance that is perpendicular from the focal point to the X' axis;
   a scaling constant A defined by the equation A=¼F; and
   wherein a first end having a coordinate X1' on the X' axis and a second end having a coordinate X2' on the X' axis, and
   the length L of the sheet of flexible material between the first end and the second end is given by the equation $$L = \int_{X1'}^{X2'} \left| A * \frac{1}{4}\sqrt{4\left(\frac{X'}{A}\right)^2+1} * 2\left(\frac{X'}{A}\right)+\ln\left|\sqrt{4\left(\frac{X'}{A}\right)^2+1}+2\left(\frac{X'}{A}\right)\right|\right|$$

wherein the shape of the first side and the second side conform to a curve formed by a plurality of points with coordinates a and b lying on the sheet and defined by the equations:

$$a = \int_{X1'}^{X'} \sqrt{1 + \left(\frac{dY'}{dX'}\right)^2} =$$

$$\left.\frac{1}{4}\left[\sqrt{4\left(\frac{X'}{A}\right)^2 + 1} * 2\left(\frac{X'}{A}\right) + \ln\left|\sqrt{4\left(\frac{X'}{A}\right)^2 + 1} + 2\left(\frac{X'}{A}\right)\right|\right]\right|_{X1'}^{X'}$$

$$b = B * \frac{\left(\left(\frac{X2'}{A}\right)*\left(\frac{X'}{A}\right) + \left(\frac{X1'}{A}\right)*\left(\frac{X'}{A}\right) - \left(\frac{X1'}{A}\right)*\left(\frac{X2'}{A}\right) - \left(\frac{X'}{A}\right)^2\right)}{\left(1 + 4\left(\frac{X'}{A}\right)^2\right)^{3/2}}$$

where a is the distance of the point from the first of two ends of the sheet and b is the distance of the point from the centerline of the sheet, and wherein the first side is composed with values of b measured to one side of the centerline and the second side is composed with values of b measured to the other side of a centerline of the sheet and B is a scaling constant.

5. The reflection device of claim 1, wherein the surface reflects light.

6. The reflection device of claim 1, wherein the surface reflects energy waves.

7. The reflection device of claim 1, wherein the sheet is a polyester film.

8. The reflection device of claim 1 wherein the first end of the sheet and the second end of the sheet and coupled using glue.

9. The reflection device of claim 1 further comprising a collector situated at a focal point of the parabola.

* * * * *